United States Patent [19]
Hashimoto

[11] Patent Number: 5,086,628
[45] Date of Patent: Feb. 11, 1992

[54] AUTOMOTIVE AIR TEMPERING APPARATUS

[75] Inventor: Kazunobu Hashimoto, New Castle Upon Tyne, United Kingdom

[73] Assignee: Nissan Motor Company, Ltd., Japan

[21] Appl. No.: 598,410

[22] Filed: Oct. 18, 1990

[30] Foreign Application Priority Data

Oct. 24, 1989 [JP] Japan .................................. 1-274803

[51] Int. Cl.$^5$ .............................................. F24F 3/00
[52] U.S. Cl. ..................................... 62/244; 236/13; 236/49.3; 165/42; 165/22
[58] Field of Search .................. 62/133, 244, 186; 236/1 B, 13, 51, 49.3, DIG. 9; 98/2.01; 165/22, 42, 43, 16, 12

[56] References Cited

U.S. PATENT DOCUMENTS 4,470,270  9/1984  Takada et al. .......................... 62/244
4,711,295 12/1987  Sakarai ............................. 236/13 X

OTHER PUBLICATIONS

"Nissan Service Manual No. 578E", Jun. 1987, pp. E9-3-E103.

*Primary Examiner*—Harry B. Tanner
*Attorney, Agent, or Firm*—Lowe, Price, LeBlanc & Becker

[57] ABSTRACT

An air tempering apparatus for use in an automotive vehicle including a duct having a first passage through which tempered air is discharged into a front compartment portion in front of the front seats and a second passage through which tempered air is discharged into a rear compartment portion in rear of the front seats. A switch is provided for manual operation in the rear compartment portion to generate a command signal to a control unit which thereby controls the amount of tempered air discharged through the second passage into the rear compartment portion.

6 Claims, 8 Drawing Sheets

AUTOMOTIVE AIR TEMPERING APPARATUS

BACKGROUND OF THE INVENTION

This invention relates to an air tempering apparatus for use in an automotive vehicle having a duct through which tempered air is directed into a passenger compartment.

In recent years, comfortable passenger compartment environment has become of prime concern and automobile manufactures have developed various types of air tempering apparatus which will create a comfortable environment in an automobile passenger compartment. In "Nissan Service Manual No. 578E", June, 1987, page 93, there is described an air tempering apparatus of the type employing a single set of a blower, an evaporator and a heater core to discharge tempered air into a front compartment portion in front of the front seats and also into a rear compartment portion in rear of the front seats. The temperature of the tempered air discharged into the front compartment portion and the temperature of the tempered air discharged into the rear compartment portion are controlled independently. Such temperature control is demanded by means of a control switch positioned in any convenient location for the driver to operate it.

When the driver is in the front compartment portion and waiting for a passenger with the air tempering apparatus being operating, he is in a comfortable environment created by the air tempering apparatus. However, the passenger just seated on a rear seat will feel an insufficient degree of cooling particularly when the sunlight is fierce. In such a case, the passenger is obliged to ask the driver to operate the control switch so as to increase the amount of the tempered air flow discharged into the rear compartment portion.

SUMMARY OF THE INVENTION

It is, therefore, a main object of the invention to provide an improved air tempering apparatus which permits a passenger seated on a rear seat to adjust his thermal environment.

There is provided, in accordance with the invention, an air tempering apparatus for use in an automotive vehicle including an ignition switch, a passenger compartment, and front and rear seats installed in the passenger compartment, the passenger compartment having a front compartment portion in front of the front seats and a rear compartment portion in rear of the front seats. The air tempering apparatus comprises a duct through which tempered air flows. The duct has a first passage for directing flow of the tempered air into the front compartment portion and a second passage for directing flow of the tempered air into the rear compartment portion. The air tempering apparatus also includes command means provided for manual operation in the rear compartment portion to generate a command signal, and control means in response to the command signal fed thereto from the command means for controlling the amount of tempered air discharged through the second passage into the rear compartment portion.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
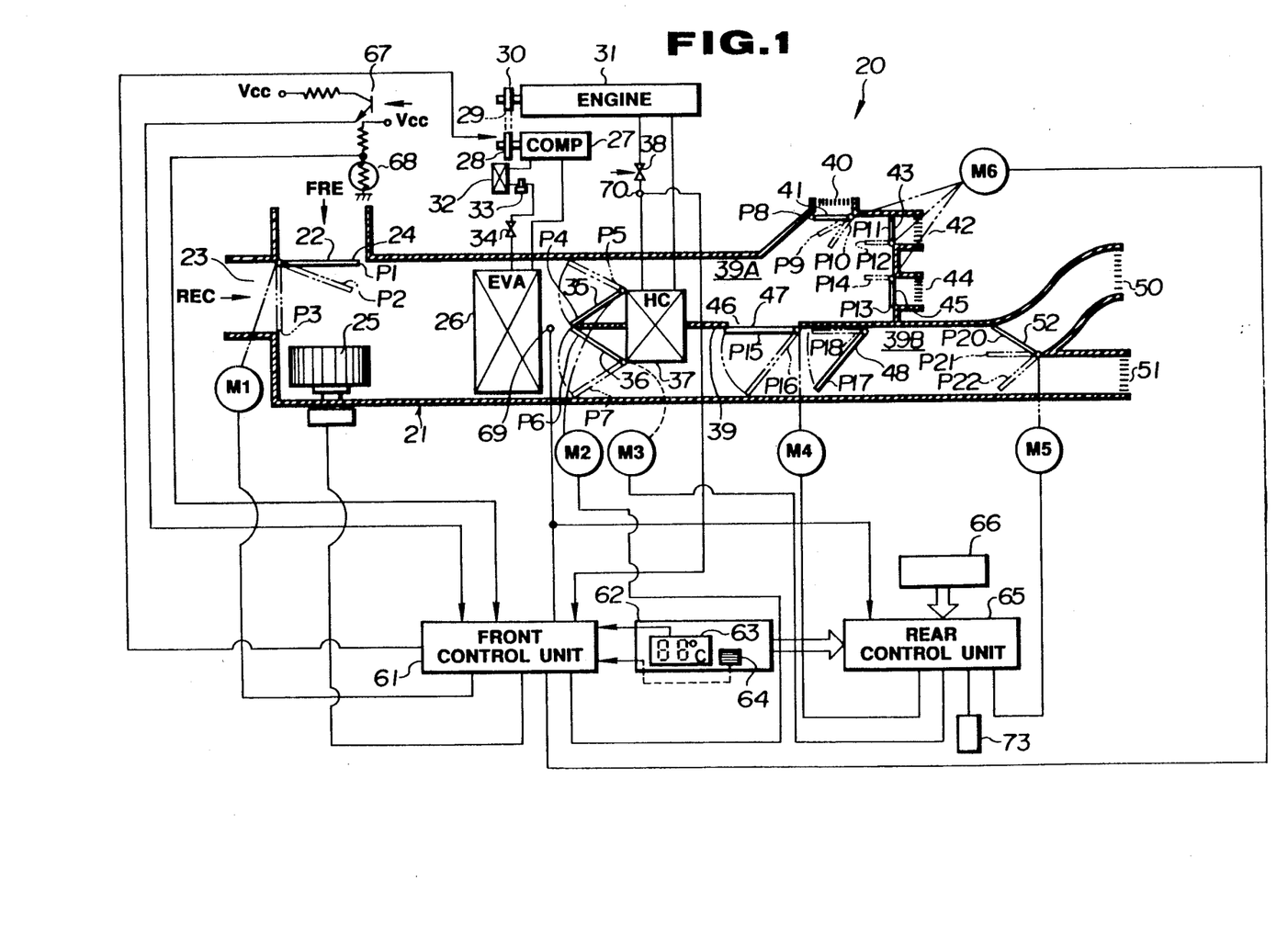
FIG. 1 is a schematic diagram of an air tempering apparatus embodying the invention.

With reference to the drawings, and in particular to FIG. 1, there is shown a schematic diagram of an air tempering apparatus for use with an automotive vehicle vehicle. The air tempering apparatus, generally designated by the numeral 20, includes an air duct 21 through which air is directed into the passenger compartment. The duct 21 has a first inlet port 22 opening to the atmosphere and a second inlet port 23 opening to the passenger compartment. An air intake door 24 is provided for movement between two positions P1 and P3. At the position P1, shown by the solid lines, where the air intake door 24 closes the first inlet port 22 and opens the second inlet port 23, the air intake door 24 permits the entry of air into the duct 21 from the passenger compartment. At the position P3, shown by the two-dotted lines, where the air intake door 24 opens the first inlet port 22 and closes the second inlet port 23, the air intake door 24 permits the entry of air into the duct 21 from the atmosphere. When the air intake door 24 is at a position P2, shown by the two-dotted lines, where it opens both of the first and second inlet ports 22 and 23, it permits the entry of air into the duct 21 from the atmosphere and the passenger compartment. The position of the air intake door 24 is adjusted by an air intake door actuator which may be taken in the form of a stepping motor M1. The stepping motor M1 operates on command from a front control unit 61 to be described later in greater detail. The duct 21 contains a blower unit 25, which may be of the type including a blower and a blower motor operable on command from the front control unit 61 for driving the blower to produce a forced flow of air through the duct 21.

The air tempering apparatus 20 also includes an air chilling heat exchanger in the form of an evaporator 26 disposed in the duct 21 downstream of the blower unit 25. The evaporator 26 forms a part of a compressor-condenser-evaporator refrigeration apparatus including a compressor 27, a condenser 32, a refrigerant tank 33 and an expansion valve 34 arranged in this order between the discharge and suction sides of the evaporator 26. The compressor 27 has a shaft with a pulley 28 around which a drive belt 29 extends. The drive belt 29 also loops around a pulley 30 fixed to the output shaft of an engine 31. The compressor 27 also has a magnetic clutch (not shown) which operates on command from the front control unit 61. When the magnetic clutch is engaged; that is, when the compressor 27 is turned on, a driving force is transmitted through the drive belt 29 from the engine 31 to the compressor 27 which thereby compresses the refrigerant. The compressed refrigerant is liquefied in the condenser 27 and the liquefied refrigerant is stored in the refrigerant tank 33. The refrigerant is supplied from the refrigerant tank 33 through the expansion valve 34 to the evaporator 26. The refrigerant is vaporized because of a rapid pressure drop as it passes the expansion valve 34. The vaporized refrigerant is admitted to the evaporator 26 which chills the air flowing around it.

At a position downstream of the evaporator 26, the duct 21 is divided by a partition 39 into two passages 39A and 39B, the first passage 39A being directed to the passengers seated on the front seats. The second passage 39B is directed to the passengers seated on the rear seats. A single air heating heat exchanger in the form of a heater core 37 is disposed in the duct 21 at a position downstream of the evaporator 26. Air flowing through the duct 21 is chilled by the evaporator 26 after which the air may be reheated to a desired degree as it passes through the heater core 37 which carries a controlled amount of engine coolant from the engine cooling system.

A first air mixing door 35 is provided at the entry of the first passage 39A on the upstream side of the heater core 37. The first air mixing door 35 is adjustably movable between two positions P4 and P5 to proportion the chilled air to be reheated across the heater core 37 so as to control the final temperature of the air discharged through the first passage 39A into the passenger compartment. At the position P4, shown by the solid lines, the chilled air is introduced into the first passage 39A without passing the heater core 37. At the position P5, shown by the two-dotted lines, the whole amount of chilled air to be introduced into the first passage 39A passes the heater core 37. The angle of opening of the first air mixing door 35, which determines the final temperature of air discharged through the first passage 39A into the passenger compartment, is adjusted by a first air mixing door actuator in the form of a stepping motor M2. The stepping motor M2 operates on command from the front control unit 61.

Similarly, a second air mixing door 36 is provided at the entry of the second passage 39B on the upstream side of the heater core 37. The second air mixing door 36 is adjustably movable between two positions P6 and P7 to proportion the chilled air to be reheated across the heater core 37 so as to control the final temperature of the air discharged through the second passage 39B into passenger compartment. At the position P6, shown by the solid lines, the chilled air is introduced into the second passage 39B without passing the heater core 37. At the position P7, shown by the two-dotted lines, the whole amount of chilled air to be introduced into the second passage 39B passes the heater core 37. The angle of opening of the second air mixing door 36, which determines the final temperature of air discharged through the second passage 39B into the passenger compartment, is adjusted by a second air mixing door actuator in the form of a stepping motor M3. The stepping motor M3 operates on command from a rear control unit 65 to be described later in greater detail.

The first passage 39A has first, second and third outlet ports referred respectively to as a front defroster port 40, a front ventilator port 42, and a front foot port 44. The front defroster port 40 opens to defog the vehicle windshield in the presence of a specified condition. A front defroster door 41 is provided for movement between two positions P8 and P10. At the position P8, shown by the solid lines, the front defroster door 41 closes the front defroster port 40. When the front defroster door 41 is at the position P9, shown by the two-dotted lines, it opens the front defroster port 40 partially. The front ventilator port 42 is connected to a plurality of exit openings formed in the vehicle instrument panel facing to the passengers seated on the front seats. A front vent door 43 is provided for movement between two positions P11 and P12. At the position P11, shown by the solid lines, the front vent door 43 closes the front ventilator port 42. When the front vent door 43 is at the position P12, shown by the two-dotted lines, it opens the front ventilator port 42. The front foot port 44 opens into the passenger compartment to direct the tempered air toward the floor portion on which the front seats are placed. A front foot door 45 is provided for movement between two positions P13 and P14. At the position P13, shown by the solid lines, the front foot door 43 closes the front foot port 44. When the front foot door 45 is at the position P14, shown by the two-dotted lines, it opens the front foot port 44. A front door actuator in the form of a stepping motor M6 is provided for controlling the positions of the respective front doors 41, 43 and 45. The stepping motor M6 operates on command from the front control unit 61.

When the air tempering apparatus is operating in a bilevel mode, the front vent door 43 is in the position P12 opening the front ventilator port 42, the front foot door 45 is in the position P14 opening the front foot port 44, and the front defroster door 41 is in the position P8 closing the front defroster port 40. During a heat mode of operation of the air tempering apparatus, the front vent door 43 is in the position P11 closing the front ventilator port 42, the front foot door 45 is in the position P14 opening the front foot port 44, and the front defroster door 41 is in the position P9 or P10 opening the front defroster port 40. During a vent mode of operation of the air tempering apparatus, the front vent door 43 is in the position P12 opening the front ventilator port 42, the front foot door 45 is in the position P13 closing the front foot port 44, and the front defroster door 41 is in the position P8 closing the front defroster port 40. During a defroster mode of operation of the air tempering apparatus, the front defrost door 41 is in the position P10 opening the front defroster port 40, the front vent door 43 is in the position P11 closing the front ventilator port 42, and the front foot door 45 is in the position P13 closing the front foot port 44.

The partition 39 is formed with a port 46 which communicate the first and second passages 39A and 39B on the downstream side of the heater core 37. A door 47 is provided for movement between two positions P15 and P16. At the position P15, shown by the solid lines, the door 47 closes the port 46 to separate the second passage 39B from the first passage 39A. When the door 47 is at the position P16, shown by the two-dotted lines, it opens the port 46 and closes the second passage 39B to introduce the whole amount of air passing the heater core 37 into the first passage 39A. A flow control door 48 is provided in the second passage 39B somewhat downstream of the door 47 for movement between two positions P17 and P18. The control door 48 has a plurality through-holes formed therein for decreasing the rate of air flow through the control door when it is placed at the position P17, shown by the solid lines. The positions of the doors 47 and 48 are adjusted by a door actuator in the form of a stepping motor M4 which operates on command from the rear control unit 65.

The second passage 39B has fourth and fifth outlet ports referred respectively to as a rear ventilator port 50 and a rear foot port 51. The rear ventilator port 50 is connected to a plurality of exit opensing in a panel facing to the passengers seated on the rear seats. The rear foot port 51 opens into the passenger compartment to direct the tempered air toward the floor portion on which the rear seats are placed. A control door 52 is provided in the second passage 39B on the upstream side of the ports 50 and 51 for movement between position P20 and P21. At the position P20, shown by the solid lines, the control door 52 closes the rear ventilator port 50 and opens the rear foot port 51. At the position P22, shown by the two-dotted lines, the control door 52 opens the rear vehtilator port 50 and closes the rear foot port 51. When the control door 52 is at a position P21, shown by the two-dotted lines, it opens the ports 50 and 51 simultaneously. The position of the control door 52 is adjusted by a rear door actuator in the form of a stepping motor M5 which is operable on command from the rear control unit 65.

The front control unit 61 controls the air intake door actuator M1, the first air mixing door actuator M2, the front door actuator M6, the blower motor of the blower unit 25, and the magnetic clutch of the compressor 27, based upon various conditions that are sensed during the operation of the air tempering apparatus. These sensed conditions includes ambient temperature, compartment temperature, insolation intensity, and intake (chilled) air temperature, engine coolant temperature. Thus, a compartment temperature sensor 64, an insolation intensity sensor 67, an ambient temperature sensor 68, an intake (chilled) air temperature sensor 69, and an engine coolant temperature sensor 70 are connected to the front control unit 61. The compartment temperature sensor 64 is positioned on a front control panel 62 to sense compartment temperature and it produces a compartment temperature signal indicative of a sensed compartment temperature Tinc. The front control panel 62 also have an LCD for displaying a desired compartment temperature value Tptc. The desired compartment temperature value Tptc is fed to the front control unit 61. The insolation intensity sensor 67 is provided to sense insolation intensity and it produces an insolation intensity signal indicative of a sensed insolation intensity Qsun. The insolation intensity sensor 67 may be of the type including a phototransistor through which a current I flows when it is exposed to sun light. In this case, the front control unit 61 calculates the sensed insolation intensity $$Qsun\left( = \int_0^{tx} I dt \right)$$

by integrating the current I over a predetermined period of time tx. The ambient temperature sensor 68 is positioned to sense ambient temperature and it produces an ambient temperature signal indicative of a sensed ambient temperature TAM. The intake (chilled) air temperature sensor 69 is positioned to sense intake (chilled) air temperature and it produces an intake (chilled) air temperature signal indicative of a sensed intake (chilled) air temperature TINT. A preferred location for this intake (chilled) air temperature sensor 69 is in the duct 21 somewhere downstream of the evaporator 26 and upstream of the first and second air mixing doors 35 and 36. The engine coolant temperature sensor 70 is positioned to sense engine coolant temperature and it produces an engine coolant temperature signal indicative of a sense engine coolant temperature. The front control unit also receives signals indicative of the states of various switches including an air conditioner switch 141, a DEF switch, a power swich, a kick-down switch, a fan switch, etc.

The rear control unit 65 receives data from the front control unit 61 and passenger's demands from a rear control panel 66 for controlling the door actuators M3, M4 and M5.

Figure 2:
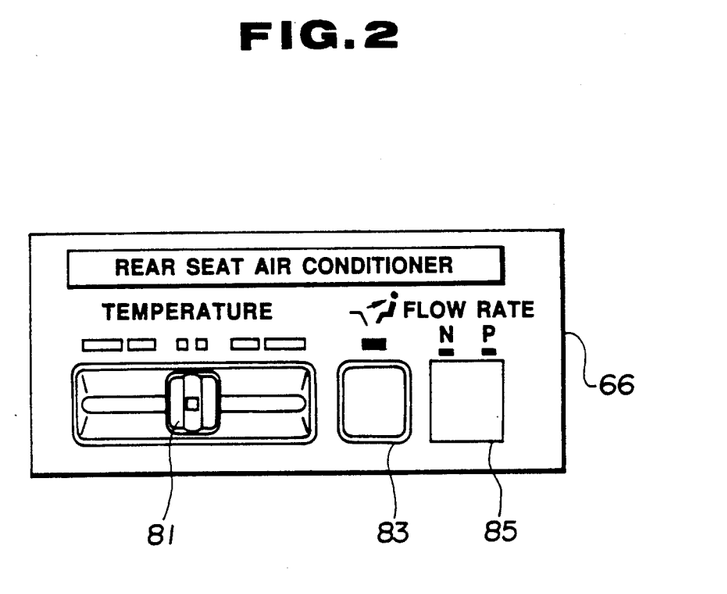
FIG. 2 is a front view of the rear control panel.

Referring to FIG. 2, the rear control panel 66 has a temperature controller of the type having a slider 81 and switches 83 and 85 mounted thereon. The temperature controller produces a signal indicative of a passenger's demand for increasing the temperature of the tempered air discharged from the second passage 39B when the slider 81 moves to the right. The rear control unit 65 satisfies this passenger's demand by controlling the second air mixing door actuator M3 to move the second air mixing door 36 toward the dotted line position P7 so as to increase the tempered air temperature. The temperature controller produces a signal indicative of a passenger's demand for decreasing the temperature of the tempered air discharged from the second passage 39B when the slider 81 moves to the left. The rear control unit 65 satisfies this passenger's demand by controlling the second air mixing door actuator M3 to move the second air mixing door 36 toward the full line position P6 so as to decrease the tempered air temperature. The switch 83 is connected in a circuit for producing a signal indicative of a passenger's demand for discharging tempered air from the second passage 39B to the rear control unit 65 when depressed once. The rear control unit 65 satisfies this passenger's demand by controlling the control door actuator M4 to move the door 47 to the full line position P15. When the switch 83 is depressed again, a signal indicative of a passenger's demand for terminating the discharge of the tempered air from the second passage 39B is produced to the rear control unit 65. The rear control unit 65 satisfies this passenger's demand by controlling the control door actuator M4 to move the door 47 to the dotted line position P16. The rear control unit 65 ignores the passenger's demand inputted through the switch 83 when the air tempering apparatus is operating in a defroster mode where the front defroster port 40 is open and the front ventilator and foot ports 42 and 45 are closed. The switch 85 is connected in a circuit for producing a signal indicative of a passenger's demand for placing the air tempering apparatus in a power mode increasing the amount of tempered air discharged from the second passage 39B when the switch 85 is depressed once. This signal is applied thourgh the rear control unit 65 to the front control unit 61. When the switch 85 is depressed again, a signal indicative of a passenger's demand for initiating the air tempering apparatus to a normal mode is produced to the rear control unit 65. This signal is applied through the rear control unit 65 to the front control unit 61. Alternatively, the rear control unit 61 may be arranged to respond the power mode demand signal by controlling the control door actuator M4 to move the control door 48 to the dotted line position P18 and to responds the normal mode demand signal by controlling the control door actuator M4 to move the control door 48 to the full line position P17. The power mode of operation of the air tempering apparatus is canceled and initiated to the normal mode when the ignition switch 73 is turned off. For this purpose, the rear control unit 65 monitors the state of the ignition switch 73 and returns the switch 85 to its initial state.

The front control unit 61 employs a digital computer which shall be regard as including a central processing unit (CPU), a read only memory (ROM), a random access memory (RAM), an input control unit, and an output control unit. The central processing unit communicates with the rest of the computer via data bus. The input control unit receives the signals from the sensors and the switches. The input control unit includes an analog-to-digital converter which converts the received analog signals from the sensors into corresponding digital signals for application to the central processing unit. The read only memory contains the program for operating the central processing unit and further contains appropriate data in look-up tables used in calculating appropriate values for controlling the door actuators M1, M2 and M6, the compressor 27 and the blower unit 25. Control words specifying calculated values are periodically transferred by the central processing unit to the output control unit which converts the transferred information into appropriate forms for application to the actuators M1, M2 and M6, the blower unit 25 and the compressor 27.

Figure 3:
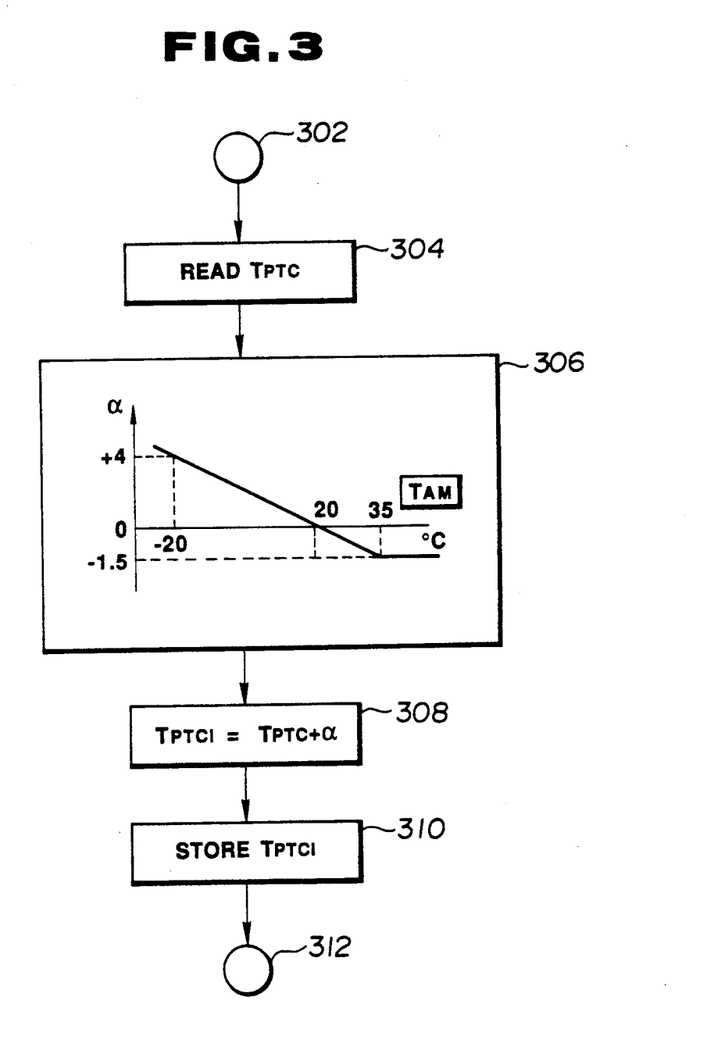
FIG. 3 is a flow diagram of the programming of the digital computer as it is used to correct the desired compartment temperature value.

FIG. 3 is a flow diagram of the programming of the digital computer used in the front control unit 61 to correct the desired compartment temperature value TPTC using a correction factor $\alpha$.

The computer program is entered at the point 302. At the point 304 in the program, the desired compartment temperature value TPTC is read. At the point 306 in the program, a correction factor $\alpha$ is calculated from a relationship programmed in the digital computer. This relationship specifies the correction factor $\alpha$ as a function of ambient temperature TAM, as shown in block 306. In the illustrated case, the function is represented by a line crossing zero when the ambient temperature TAM is 20° C. The correction factor $\alpha$ is $-1.5$ when the ambient temperature TAM is 35° C. and $+4$ when the ambient temperature TAM is $-20°$ C. This relationship may be obtained experimentally.

At the point 308 in the program, the central processing unit calculates a target compartment temperature TPTC1 by adding the calculated correction factor $\alpha$ to the desired compartment temperature value TPTC. At the point 310 in the program, the calculated target compartment temperature value TPTC1 is stored in the computer memory. Following this, the program proceeds to the point 312 where the program is returned to the entry point 302.

Figure 4:
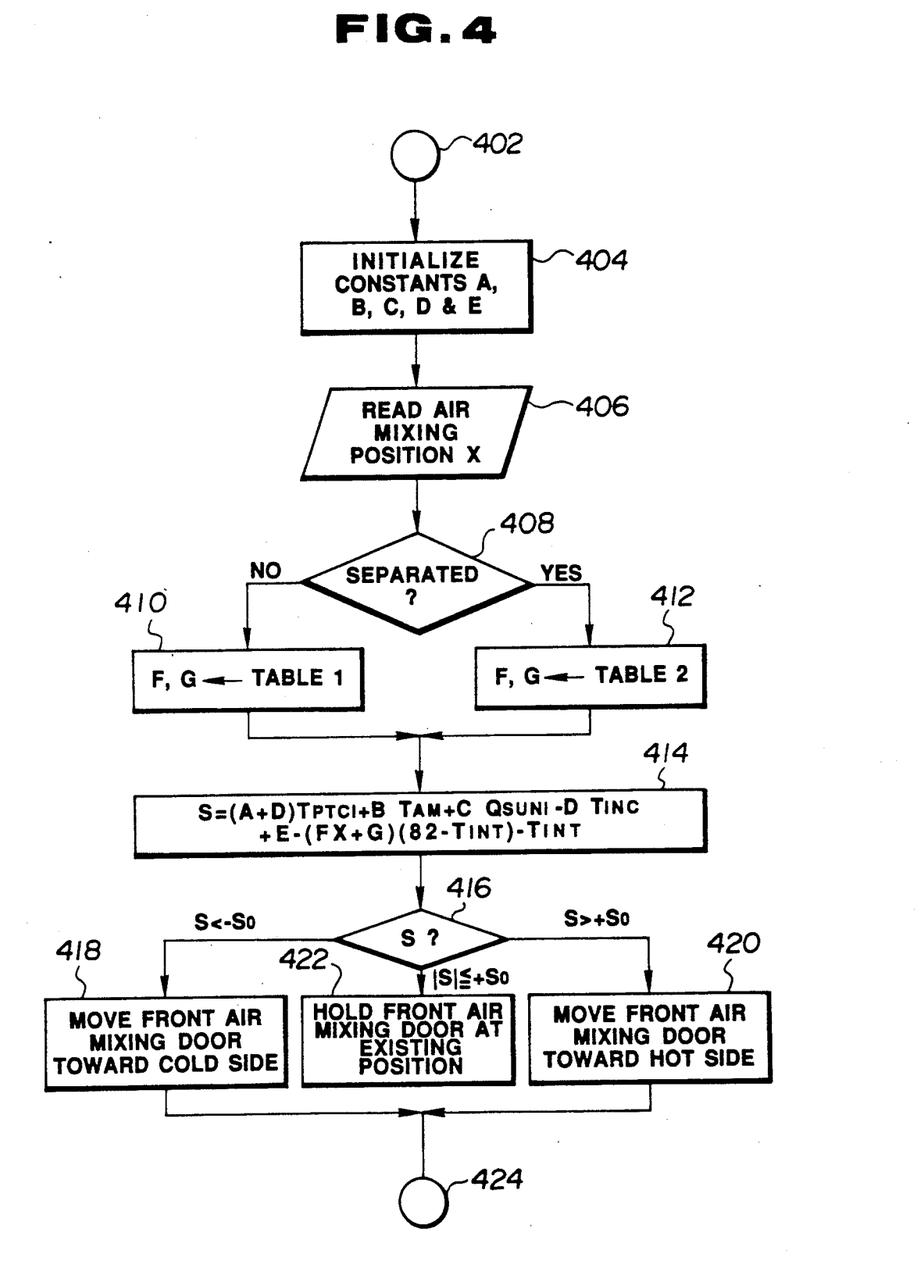
FIG. 4 is a flow diagram of the programming of the digital computer as it is used to calculated a required value for first air mixing door position.

FIG. 4 is a flow diagram of the programming of the digital computer as it is used to calculate a required value Xo for the angle of opening of the first air mixing door 35. At the point 402 in the program, the computer program is entered. At the point 404 in the program, various constants A, B, C, D and E are set for use in calculating a tempered air temperature error S. At the point 406 in the program, the air mixing door position signal indicative of the actual first air mixing door position X fed from the first air mixing door position sensor is converted to digital form and read into the computer memory.

At the point 408 in the program, a determination is made as to whether or not the door 47 is at the position P15 closing the port 46 to separate the first and second passages 39A and 39B. For this determination, the position of the door 47 is monitored. If the answer to this question is "no", then it means that no tempered air is discharged through the second passage 39B into the rear compartment portion and the program proceeds to the point 410 where the central processing unit selects TABLE 1 which specifies constants F and G as a function of first air mixing door position X.

TABLE 1

| X | F | G |
|---|---|---|
| 0–X1 | F1 | G1 |
| X1–X2 | F2 | G2 |
| X2– | F3 | G3 |

Constants F and G are set at values F1 and G1, respectively, when the first air mixing door 35 is positioned at an angle ranging from 0 to X1, at values F2 and G2, respectively, when the first air mixing door 35 is positioned at an angle ranging from X1 to X2, and at values F3 and G3, respectively, when the first air mixing door 35 is positioned at an angle greater than X2. After the constants F and G have been set, the program proceeds from the point 410 to the point 414.

If the answer inputted at the point 408 is "yes", then it means that tempered air is discharged through the second assage 39B into the rear compartment portion and the program proceeds to the point 412 where the central processing unit selects TABLE 2 which specifies the constants F and G according to the first air mixing door position X.

TABLE 2

| X | F | G |
|---|---|---|
| 0–X1 | F6 | G6 |
| X1–X2 | F7 | G7 |
| X2– | F8 | G8 |

Constants F and G are set at values F6 and G6, respectively, when the first air mixing door 35 is positioned at an angle ranging from 0 to X1, at values F7 and G7, respectively, when the first air mixing door 35 is positioned at an angle ranging from X1 to X2, and at values F8 and G8, respectively, when the first air mixing door 35 is positioned at an angle greater than X2. The values F6, F7 and F8 are greater than the values F1, F2 and F3, respectively. The values G6, G7, and G8 are greater than the values G1, G2 and G3, respectively. After the constants F and G have been set, the program proceeds from the point 412 to the point 414.

At the point 414 in the program, the central processing unit calculates a temperature error S between the target tempered air temperature value and the actual tempered air temperature value as $S = \{(A+D)TPTC1 + BTAM + CQsun - DTINC + E\} - \{(FX+G)(82-TINT)+TINT\}$ where X is the actual first air mixing door position value. The term $\{(A+D)TPTIC1 + BTAM + CQsun - DTINC + E\}$ indicates the target tempered air temperature value and the term $\{(FX+G)(82-TINT)+TINT\}$ indicates the actual tempered air temperature value.

At the point 416 in the program, the calculated temperature error S is compared with a predetermined value So (for example, 2° C.). If $S < -So$, then the program proceeds to the point 418 where the central processing unit calculates a required value Xo for first air mixing door position and stores the calculated value Xo in the computer memory. This stored value Xo is transferred, causing the first air mixing door actuator M2 to move the first air mixing door 35 in a closing direction toward the full line position P4 to decrease the temperature of the tempered air discharged from the first passage 39A into the passenger compartment. If $S > +So$, then the program proceeds to the point 420 where the central processing unit calculates a required value Xo for first air mixing door position and stores the calculated value Xo in the computer memory. This stored value Xo is transferred, causing the first air mixing door actuator M2 to move the first air mixing door 35 in an opening direction toward the dotted line position P5 to increase the temperature of the tempered air discharged from the first passage 39A into the passenger compartment. Otherwise, the program proceeds to the point 422 where the central processing unit calculates a required value Xo for air mixing door position and stores the calculated value Xo in the computer memory. This stored value Xo is transferred, causing the first air mixing door actuator M2 to hold the first air mixing door 35 at the existing position. Following this, the program proceeds to the point 424 where the program is returned to the entry point 402.

Figure 5:
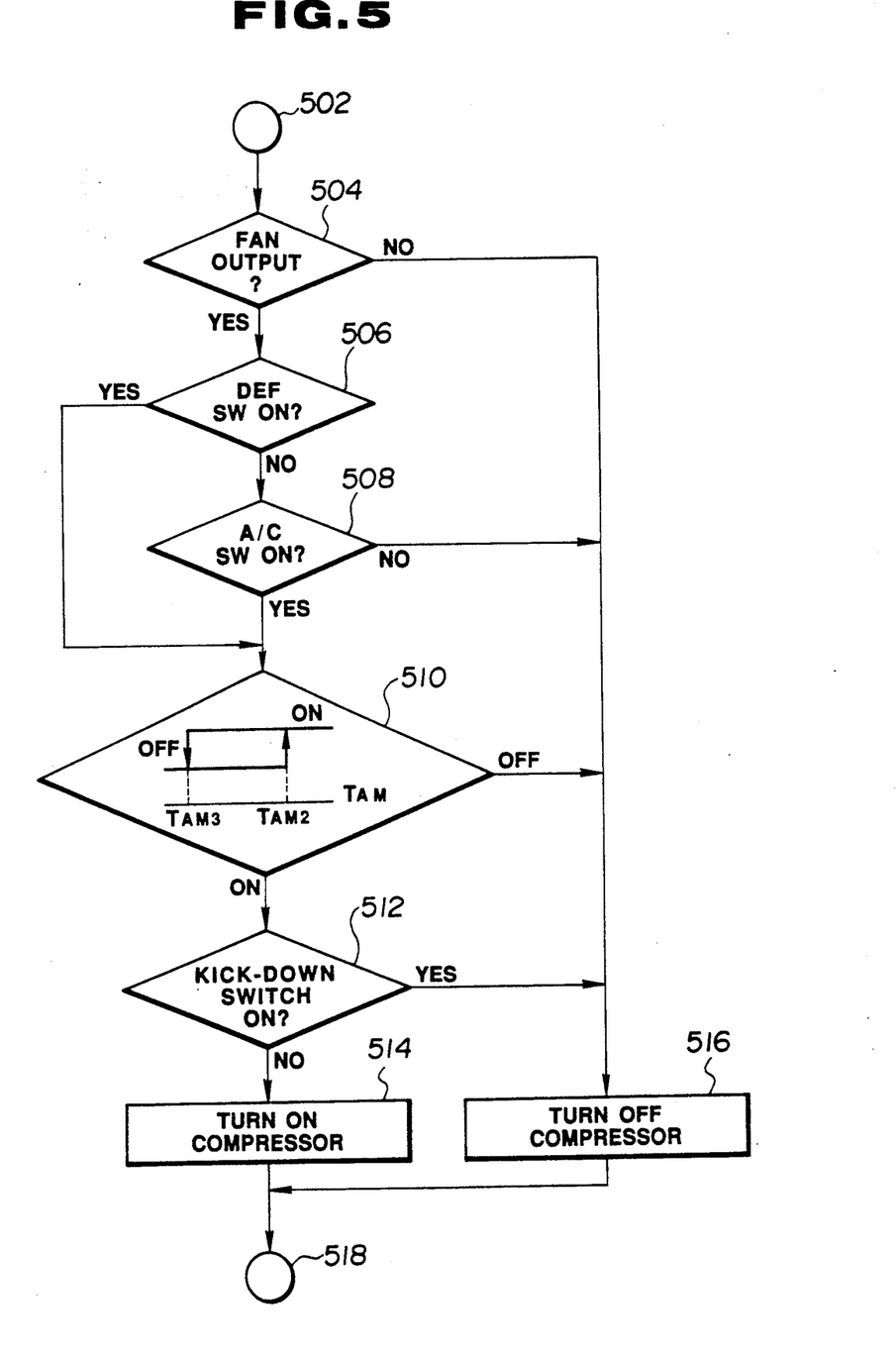
FIG. 5 is a flow diagram of the programming of the digital computer as it is used to control the compressor.

FIG. 5 is a flow diagram of the programming of the digital computer as it is used to control the compressor 27. At the point 502, the computer program is entered. At the point 504 in the program, a determination is made as to whether or not the blower unit 25 is operating. If the answer to the question is "yes", then the program proceeds to the point 506. Otherwise, the program proceeds to the point 516 where the center processing unit turns the compressor 27 off by disengaging the magnetic clutch of the compressor 27. Following this, the program proceeds to the end point 518.

At the point 506 in the program, a determination is made as to whether or not the DEF switch is turned on to open the front defroster port 40. If the answer to this question is "yes", then the program proceeds to the point 508. Otherwise, the program jumps the point 508 to the point 510. At the point 508, another determination is made as to whether or not the power switch is turned on to operate the air tempering apparatus. If the answer to this question is "yes", then the program proceeds to the point 510. Otherwise, the program proceeds to the point 516 where the compressor 27 is turned off.

At the point 510 in the program, the central processing unit determines the range of the ambient temperature. This determination is made by a comparison of the read ambient temperature TAM hysteretically with a reference value TAM2 when the ambient temperature is increasing and with another reference value TAM 3 smaller than the reference value TAM2 when the ambient temperature is decreasing. This is effective to avoid the tendency toward hunting. If the read ambient temperature TAM is greater than the reference value TAM2 when the ambient temperature is increasing or if the read ambient temperature TAM is greater than the reference value TM3 when the ambient temperature is decreasing, then it means that the read ambient temperature TAM is in a high temperature range and the program proceeds to the point 512. If the read ambient temperature TAM is less than the reference value TAM2 when the ambient temperature is increasing or if the read ambient temperature TAM is less than the reference value TAM3 when the ambient temperature is decreasing, then it means that the read ambient temperature TAM is in a low temperature range and the program proceeds to the point 516 where the compressor 27 is turned off. This is effective to protect the compressor 27 from freezing when the ambient temperature is extremely low in winter.

At the point 512 in the program, a determination is made as to whether or not the kick-down switch is turned on to demand a rapid acceleration. If the answer to this question is "yes", then the program proceeds to the point 516 where the compressor 27 is turned off. Otherwise, the program proceeds to the point 514 where the central processing unit turns the compressor 27 on by engaging the magnetic clutch of the compressor 27. Following this, the program proceeds to the point 158 where the program is returned to the entry point 502.

Figure 6:
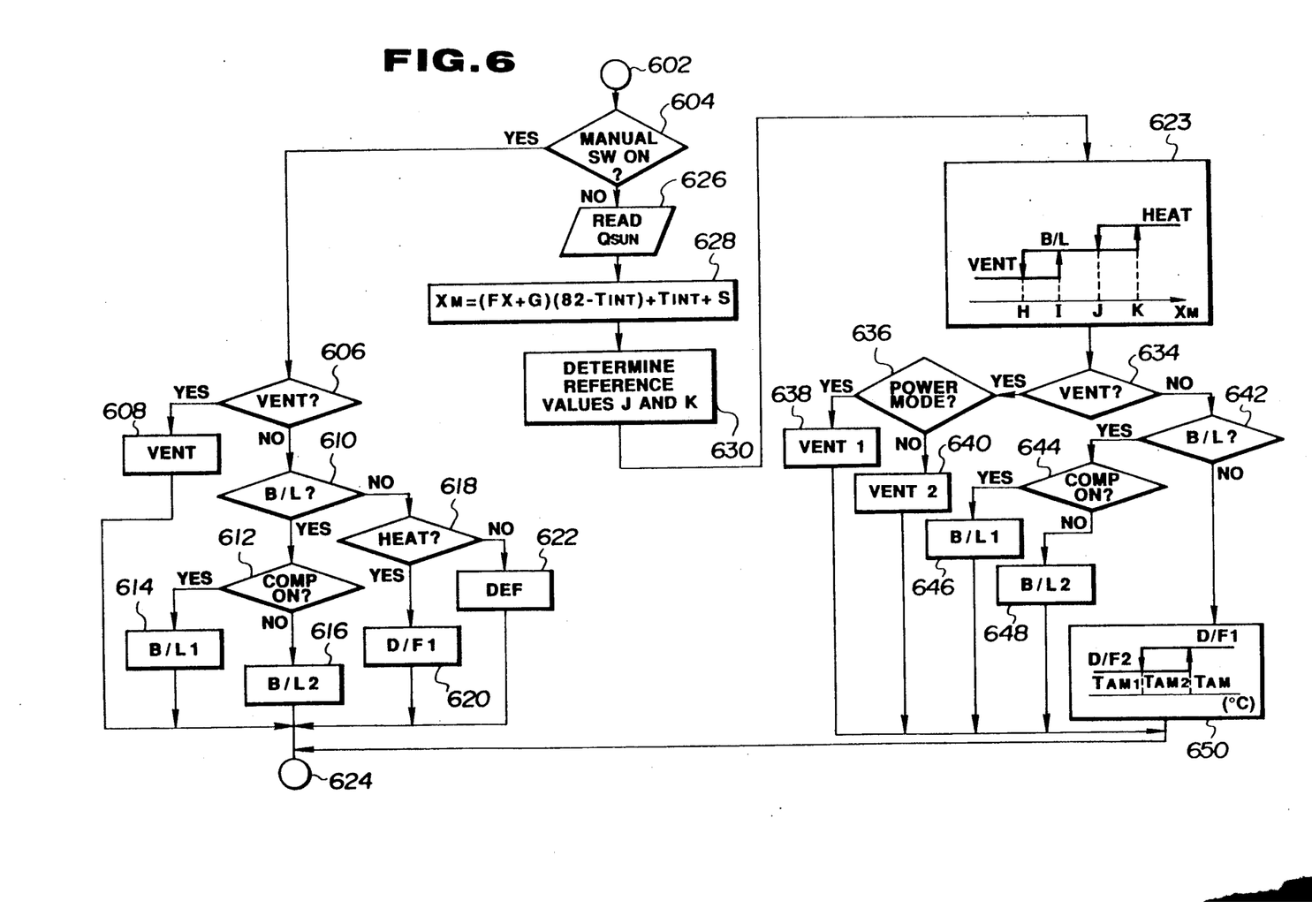
FIG. 6 is a flow diagram of the programming of the digital computer as it is used to control the front door actuator.

FIG. 6 is a flow diagram of the programming of the digital computer used to control the front door actuator M6. The computer program is entered at the point 602. At the point 604 in the program, a determination is made as to whether or not the manual switch provided on the front control panel 62 is operated to manually select one of vent, bilevel, defroster and heat modes. If the answer to this question is "yes", then it means that a manual mode is selected and the program proceeds to another determination step at the point 606. This determination is as to whether or not the vent mode is selected by the manual switch. If the answer to this question is "yes", then the program proceeds to the point 608 where the central processing unit produces a command causing the front door actuator M6 to open the front ventilator port 42 with the front defroster and foot ports 40 and 44 being closed. Following this, the program proceeds to the point 624 where the program is returned to the entry point 602.

If the answer to the question inputted at the point 606 is "no", then the program proceeds to the point 610 where a determination is made as to whether or not the bilevel (B/L) mode is selected by the manual switch. If the answer to this question is "yes", then the program proceeds to another determination step at the point 612. This determination is as to whether or not the compressor 27 is operating. If the answer to this question is "yes", then the program proceeds to the point 614 where the central processing unit selects a first bilevel (B/L1) mode and produces a command causing the front door actuator M6 to move the front vent and foot doors 43 and 45 so as to open the front ventilator and foot ports 42 and 44 with the defroster port 40 being closed. Otherwise, the program proceeds to the point 616 where the central processing unit selects a second bilevel (B/L2) mode and produces a command causing the front door actuator M6 to move the front defroster, vent and foot doors 41, 43 and 45 so as to open all of the front defroster, ventilator and foot ports 40, 42 and 44. Following this, the program proceeds to the point 624 where the program is returned to the entry point 602.

If the answer to the question inputted at the point 610 is "no", then the program proceeds to another determination step at the point 612. This determination is as to whether or not the heat mode is selected by the manual switch. If the answer to this question is "yes", then the program proceeds to the point 620 where the central processing unit selects a def-foot (D/F1) mode and produces a command causing the front door actuator M6 to move the front defroster door 41 to the dotted line position P9 and the front foot door 45 to the dotted line position P14 so as to open the front defroster and foot ports 40 and 44 with the ventilator port 42 being closed. In the D/F1 mode, the amounts of air discharged from the front defroster and foot ports 40 and 44 are maintained at a predetermined ratio, e.g. 1:9. Following this, the program proceeds to the point 624 where the program is returned to the entry point 602.

If the answer to the question inputted at the point 618 is "no", then it means the defroster mode is selected by the manual switch and the program proceeds to the point 622 where the central processing unit produces a command causing the front door actuator M6 to move the front defroster door 41 to the dotted line position P10 so as to open the defroster port 40 with the ventilator and foot ports 42 and 44 being closed. Following this the program proceeds to the end point 624.

If the answer to the question inputted at the point 604 is "no", then it means an automatic mode is selected and the program proceeds to the point 626 where the insolation intensity Qsun is read into the computer memory. At the point 628 in the program, the central processing unit calculates a required value XM for the temperature of the tempered air discharged from the first passage 39A as $XM = (F \cdot X + G)(82 - TINT) + TINT + S$. At the point 630 in the program, the central processing unit determines reference values J and K as a function of insolation intensity Qsun.

At the point 632 in the program, the central processing unit selects one of vent, bilevel (B/L) and heat modes according to the calculated value XM. This selection is made by a comparison of the required temperature value XM hysteretically with a reference value H when the required temperature value XM is decreasing and with a reference value I greater than the reference value H when the required temperature value XM is increasing and a comparison of the required temperature value XM hysteretically with the reference value J greater than the reference value I when the required temperature value XM is decreasing and with the reference value K greater than the reference value J when the required temperature value XM is increasing. The vent mode is selected if the required temperature value XM is less than the reference value H when the required temperature value XM is decreasing or if the required temperature value XM is less than the reference value I when the required temperature value XM is increasing. The heat mode is selected if the required temperature value XM is greater than the reference value J when the required temperature value XM is decreasing or if the required temperature value XM is greater than the reference value K when the required temperature value XM is increasing. The bilevel (B/L) mode is selected in the other cases.

At the point 634 in the program, a determination is made as to whether or not the vent mode is selected. If the answer to this question is "yes", then the program proceeds to another determination step at the point 636. This determination is as to whether or not a power mode is selected by the passenger through the flow control switch 85 provided on the rear control panel 66. If the answer to this question is "yes", then the program proceeds to the point 638 where the central processing unit selects a first vent (vent 1) mode and produces a command causing the front door actuator M6 to move the front vent door 43 at a first angle with the front defroster and foot ports 40 and 44 being closed. Otherwise, it means that a normal mode is selected and the program proceeds to the point 640 where the central processing unit selects a second vent (vent 2) mode and produces a command causing the front door actuator M6 to move the front vent door 43 at a second angle greater than the first angle with the front defroster and foot ports 40 and 44 being closed. The front vent door 43 opens narrower in the power mode than in the normal mode to decrease the rate of flow of the tempered air discharged from the ventilator port 40 and thus increase the rate of flow of the tempered air discharged from the second passage 39B. Following this, the program proceeds to the point 624.

If the answer to the question inputted at the point 634 is "no", then the program proceeds to the point 642 where a determination is made as to whether or not the bilevel (B/L) mode is selected. If the answer to this question is "yes", then the program proceeds to another determination step at the point 644. This determination is as to whether or not the compressor 27 is operating. If the answer to this question is "yes", then the program proceeds to the point 646 where the central processing unit selects the first bilevel (B/L1) mode and produces a command causing the front door actuator M6 to move the front vent and foot doors 43 and 45 so as to open the front ventilator and foot ports 42 and 44 with the defroster port 40 being closed. Otherwise, the program proceeds to the point 648 where the central processing unit selects the second bilevel (B/L2) mode and produces a command causing the front door actuator M6 to move the front defroster, vent and foot doors 41, 43 and 45 so as to open all of the front defroster, ventilator and foot ports 40, 42 and 44. Following this, the program proceeds to the point 624.

If the answer to the question inputted at the point 642 is "no", then it means that the heat mode is selected and the program proceeds to the point 659 where one of the first and second def-toot modes is selected. This selection is made by a comparison by a comparison of the ambient temperature value TAM hysteretically with a first reference value TAM1 (for example, $-3°$ C.) when the ambient temperature is decreasing and with a second reference value TAM2 (for example, $0°$ C.) greater than the first reference value TAM1 when the ambient temperature is increasing. The central processing unit selects the first def-foot (D/F1) mode and produces a command causing the front door actuator M6 to move the front defroster door 41 to the dotted line position P9 and the front foot door 45 to the dotted line position P14 if the ambient temperature value TAM is greater than the first reference value TAM1 when the ambient temperature is decreasing or if the ambient temperature value TAM is greater than the second reference value TAM2 when the ambient temperature is increasing. The central processing unit selects the second def-foot (D/F1) mode and produces a command causing the front door actuator M6 to move the front defroster door 41 to the dotted line position P10 and the front foot door 45 to the dotted line position P14 if the ambient temperature value TAM is less than the first reference value TAM1 when the ambient temperature is decreasing or if the ambient temperature value TAM is less than the second reference value TAM2 when the ambient temperature is increasing. Thus, the amount of the tempered air discharged from the front defroster door 40 is smaller in the first def-foot mode than in the second def-foot mode. Following this the program proceeds to the point 624 where the program is returned to the entry point 602.

Figure 7:
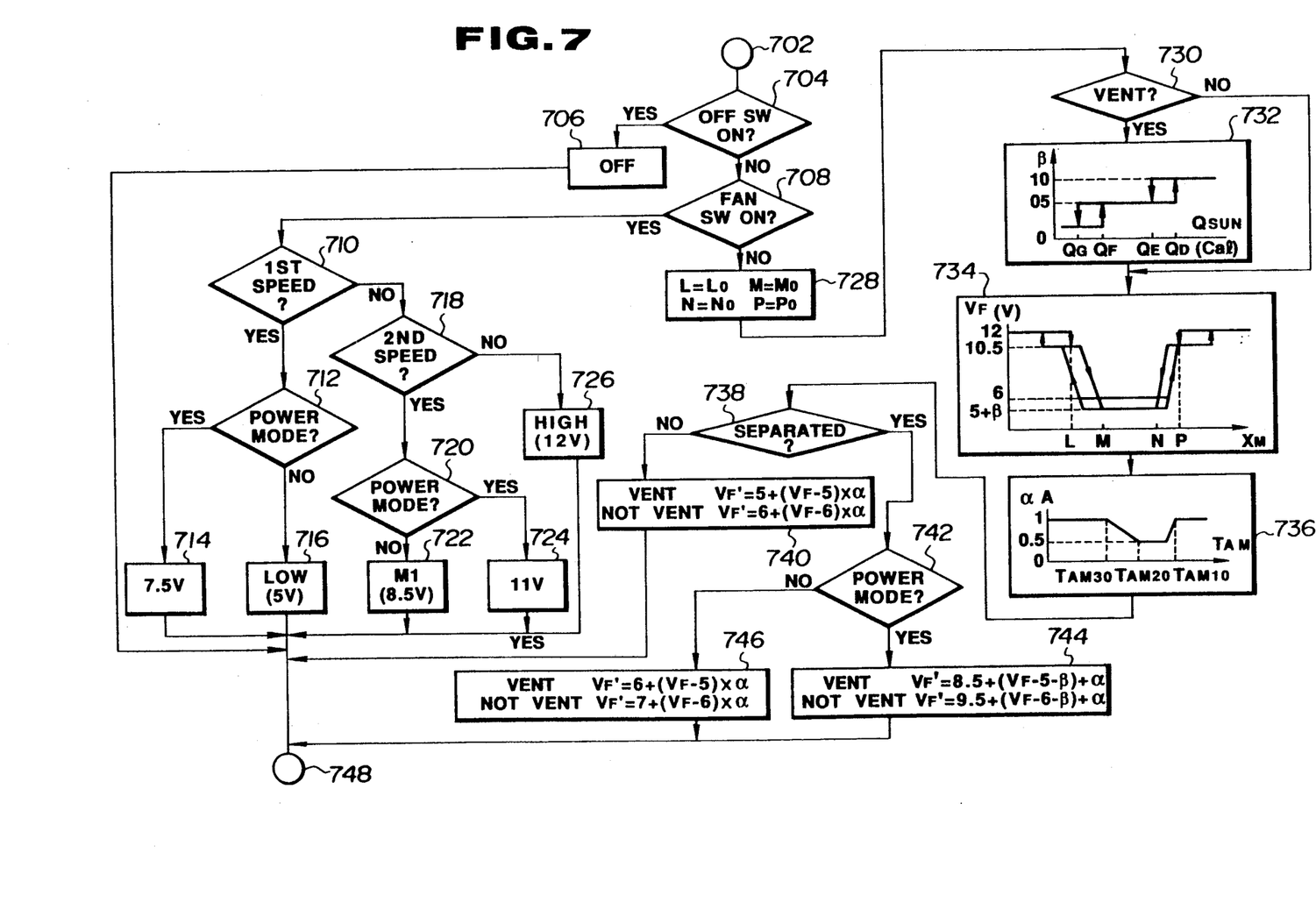
FIG. 7 is a flow diagram of the programming of the digital computer as it is used to control the amount of tempered air discharged into the passenger compartment.

FIG. 7 is a flow diagram of the programming of the digital computer as it is used to control the amount of tempered air discharged into the passenger compartment. The computer program is entered at the point 702. At the point 704 in the program, a determination is made as to whether or not the OFF switch is operated to disconnect the air tempering apparatus from the power source. If the answer to this question is "yes", then the program proceeds to the point 706 where the blower unit 25 is turned off and then to the point 748 where the program is returned to the entry point 702.

If the answer to the question inputted at the point 704 is "no", then the program proceeds to another determination step at the point 708. This determination is as to whether or not the blower switch is turned on. If the answer to this question is "yes", then the program proceeds to the point 710. Otherwise, the program proceeds to the point 728.

At the point 710 in the program, a determination is made as to whether or not the blower unit 25 is set to operate at a first, low speed. If the answer to this question is "yes", then the program proceeds to another determination step at the point 712. This determination is made as to whether or not the flow control switch 85 provided on the rear control panel 66 is set to command the power mode. If the answer to this question is "yes", then the program proceeds to the point 714 where the central processing unit produces a command causing application of a first voltage (for example, 7.5 volts) to the blower unit 25. Otherwise, it means that the flow control switch 85 is set to demand the normal mode and the program proceeds to the point 716 where the central processing unit produces a command causing application of a second voltage (for example, 5 volts) smaller than the first voltage to the blower unit 25. Thus, a higher voltage is applied to the blower unit 25 which thereby produces a higher rate of air flow in the power mode than in the normal mode.

If the answer to the question inputted at the point 710 is "no", then the program proceeds to another determination step at the point 718. This determination is as to whether or not the blower unit 25 is set to operate at a second, intermediate speed. If the answer to this question is "yes", then the program proceeds to another determination step at the point 720. This determination is as to whether or not the flow control switch 85 is set to demand the power mode. If the answer to this question is "no", then it means that the flow control switch 85 is set to demand the normal mode and the program proceeds to the point 722 where the central processing unit produces a command causing application of a third voltage (for example, 8.5 volts) greater than the first voltage to the blower unit 25. If the flow control switch 83 is set to demand the power mode, then the program proceeds from the point 720 to the point 724 where the central processing unit produces a command causing application of a fourth voltage (for example, 11 volts) greater than the third voltage to the blower unit 25. Thus, a higher voltage is applied to the blower unit 25 which thereby produces a higher rate of air flow in the power mode than in the normal mode.

If the answer to the question inputted at the point 718 is "no", then it means the blower unit 25 is set to operate at a third, high speed and the program proceeds to the point 726 where the central processing unit produces a command causing application of a fifth voltage (for example, 12 volts) greater than the fourth voltage to the blower unit 25.

At the point 728 in the program, the constants L, M, N and P are initialized to Lo, Mo, No and Po, respectively. At the point 730 in the program, a determination is made as to whether or not the air tempering apparatus is operating in the vent mode. If the answer to this question is "yes", then the program proceeds to the point 732 and then to the point 734. Otherwise, the program jumps the point 732 to the point 734.

At the point 732 in the program, the central processing unit sets a correction factor $\beta$ used in correcting the voltage VF to be applied to the blower unit 25. This correction factor setting is made by a comparison of the insolation intensity Qsun hysteretically with a reference value QC when the insolation intensity Qsun is decreasing and with a reference value QF greater than the reference value QC when the insolation intensity Qsun is increasing and a comparison of the insolation intensity Qsun hysteretically with a reference value QE greater than the reference value QF when the insolation intensity Qsun is decreasing and with a reference value QD greater than the reference value QE when the insolation intensity Qsun is increasing. A first value (for example, 0) is set for the correction factor $\beta$ if the insolation intensity Qsun is less than the reference value QE when the insolation intensity Qsun is decreasing or if the insolation intensity Qsun is less than the reference value QF when the insolation intensity Qsun is increasing. A third value (for example, 1.0) is set for the correction factor $\beta$ if the insolation intensity Qsun is greater than the reference value QE when the insolation intensity Qsun is decreasing or if the insolation intensity Qsun is greater than the reference value QD when the insolation intensity Qsun is increasing. A second value (for example, 0.5) greater than the first value and less than the third value is set for the correction factor $\beta$ in the other cases.

At the point 734 in the program, the central processing unit calculates a blower driving voltage VF from a relationship programmed into the computer. This relationship, shown in the block 734, defines blower driving voltage VF as a function of required tempered air temperature XM. The blower driving voltage VF is high for a rapid cooling when the required tempered air temperature XM is less than a reference value L and for a rapid worming when the required tempered air temperature XM is greater than a reference value P. The blower driving voltage VF is low when the required tempered air temperature XM is in a range from a reference value M greater than the reference value L to a reference value N less than the reference value P. For example, the blower driving voltage VF is set at a low value equal to 5 volts plus the correction factor $\beta$ when the air tempering apparatus is operating in the vent mode and at a low value equal to 6 volts when the air tempering apparatus is operating in a mode other than the vent mode.

At the point 736 in the program, the central processing unit calculates a correction factor $\alpha$ from a relationship programmed into the computer. This relationship, shown in the block 736, defines correction factor $\alpha$ as a function of ambient temperature TAM. The correction factor $\alpha$ is set at 1 when the ambient temperature TAM is less than a first reference value TAM30 or when the ambient temperature TAM is greater than a third reference value TAM10. The correction factor $\alpha$ is set at a value decreasing from 1 to 0.5 as the ambient temperature TAM increases when the ambient temperature TAM is in a range from the first reference value TAM10 to a second reference value TAM20 greater than the first reference value TAM10. The correction factor $\alpha$ is set at 0.5 when the ambient temperature TAM is in a range from the second reference value TAM20 to the third reference value TAM30 greater than the second reference value TAM20.

At the point 738 in the program, a determination is made as to whether or not tempered air is discharged from the second passage 39B into the rear compartment portion. If the answer to this question is "no", then the program proceeds to the point 740 where the central processing unit calculates a required value VF' for the blower unit driving voltage to be applied to the blower unit 25 as $VF'=5+(VF-5)\times\alpha$ (volts) where VF is a value calculated at the point 734 when the air tempering apparatus is in the vent mode and $VF'=6+(VF-6)\times\alpha$ (volts) when the air tempering apparatus is in a mode other than the vent mode. The required blower unit voltage value VF' is greater in the vent mode than in the other modes. If the answer to the question inputted at the point 783 is "no", then the program proceeds to another determination step at the point 742. This determination is as to whether or not the flow control switch 85 is set to demand the power mode. If the answer to this question is "yes", then the program proceeds to the point 744 where the central processing unit calculates a required value VF' for blower unit driving voltage as $VF'=8.5+(FV-5-\beta)+\alpha$ (volts) in the vent mode and as $VF'=9.5+(VF-6-\beta)+\alpha$ in a mode other than the vent mode. Otherwise, the program proceeds from the point 742 to the point 746 where the central processing unit calculates a required value VF' for blower unit driving voltage as $VF'=6+(VF-5)\times\alpha$ in the vent mode and as $VF'=7+(VF-6)\times\alpha$. The required blower unit driving voltage value VF' is greater when the tempered air is discharged from both of the first and second passages 39A and 39B than when the tempered air is discharged from the first passage 39A only. In addition, the required blower unit driving voltage value VF' is greater in the power mode than in the normal mode. Following this, the program proceeds to the point 748 where the program is returned to the entry point 702.

Figure 8:
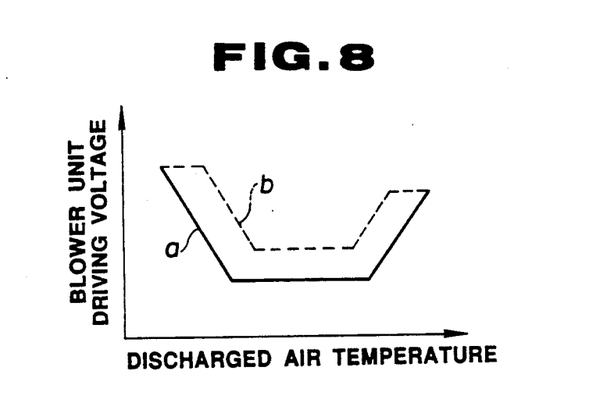
FIG. 8 is a graph of blower motor driving voltage versus tempered air temperature.

FIG. 8 is a graph showing voltages applied to the blower unit 25 with respect to the required value XM for the temperature of tempered air discharged through the second passage 39B into the rear compartment portion. The solid curve a relates to the case where the normal mode is selected and the dotted curve b relates to the case where the power mode is selected. As can be seen from FIG. 8, the voltage applied to the blower unit 25 is higher in the power mode than in the normal mode for the same value XM. Thus, the amount of tempered air discharged through the second passage 39B into the rear compartment portion is greater in the power mode than the normal mode for the same value XM.

Figure 9:
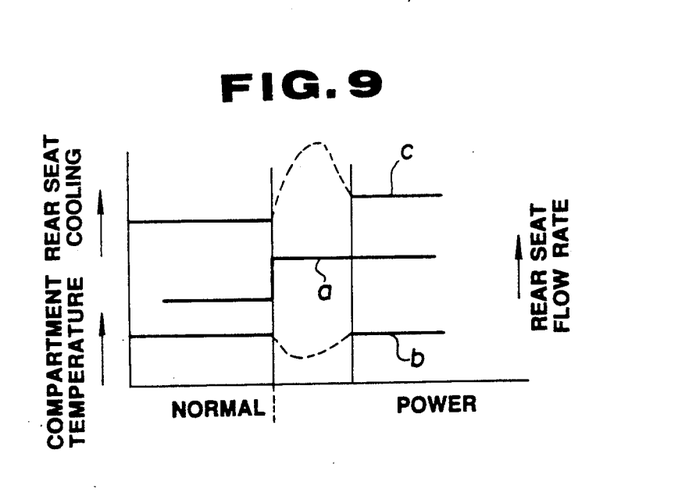
FIG. 9 is a graph used in explaining the effect of the invention.

In addition, when the vent mode is selected, the front vent door 43 opens at an angle smaller in the power mode than in the normal mode. Thus, the amount of tempered air discharged through the first passage 39A into the front compartment portion is less and the amount of tempered air discharged through the second passage 39B into the rear compartment portion is greater in the power mode than in the normal mode. As the amount of tempered air through the second passage 39B into the rear compartment portion increases, the temperature of the rear compartment portion decreases, as indicated by the curve b of FIG. 9.

What is claimed is:

1. An air tempering apparatus for use in an automotive vehicle, including an ignition switch, a passenger compartment, and front and rear seats installed in the passenger compartment, the passenger compartment having a front compartment portion in front of the front seats and a rear compartment portion in rear of the front seats, the air tempering apparatus comprising:
   a duct through which tempered air flows, the duct having a first passage for directing flow of the tempered air into the front compartment portion and a second passage for directing flow of the tempered air into the rear compartment portion;
   a single blower operable at variable speeds for producing a forced flow of air through the duct;
   command means provided for manual operation in the rear compartment portion to generate a command signal; and
   control means in response to the command signal fed thereto from the command means for decreasing the amount of tempered air discharged into the front compartment portion to increase the amount of tempered air discharged through the second passage into the rear compartment portion.

2. The air tempering apparatus as claimed in claim 1, wherein the control means includes means in response to the command signal for increasing the speed of the blower to increase the amount of tempering air flowing through the duct so as to increase the amount of tempered air discharged through the second passage into the rear compartment portion.

3. The air tempering apparatus as claimed in claim 1, wherein the control means includes means for canceling the command signal when the ignition switch is turned off.

4. The air tempering apparatus as claimed in claim 1, wherein the command means includes means provided for manual operation in the rear compartment portion for selecting one of first and second modes of operation of the air tempering apparatus, and means for producing the command signal when the second mode is selected, and wherein the control means includes means responsive to the command signal for decreasing the amount of tempered air discharged through the first passage into the front compartment portion to increase the amount of tempered air discharged through the second passage into the rear compartment portion, and means for initializing the air tempering apparatus into the first mode when the ignition switch is turned off.

5. The air tempering apparatus as claimed in claim 1, wherein the command means includes means provided for manual operation in the rear compartment portion for selecting one of first and second modes of operation of the air tempering apparatus, and means for producing the command signal when the second mode is selected, and wherein the control means includes means responsive to the command signal for increasing the amount of tempered air flowing through the duct to increase the amount of tempered air discharged through the second passage into the rear compartment portion, and means for initializing the air tempering apparatus into the first mode when the ignition switch is turned off.

6. The air tempering apparatus as claimed in claim 1, wherein the first passage has at least one outlet port opening into the front compartment portion and wherein the control means includes means for decreasing the amount of tempered air discharged through the outlet port into the front compartment portion to increase the amount of tempered air discharged through the second passage into the rear compartment portion.

* * * * *